United States Patent [19]
Workman, Jr.

[11] 3,791,459

[45] Feb. 12, 1974

[54] MOTOR REVERSING CONTROL FOR FLUID OPERATED TOOL

[75] Inventor: William Workman, Jr., Spring Lake, Mich.

[73] Assignee: Gardner-Denver Company, Quincey, Ill.

[22] Filed: Sept. 5, 1972

[21] Appl. No.: 286,385

[52] U.S. Cl......................... 173/12 V, 91/33, 91/59, 417/315
[51] Int. Cl............................................. B25b 23/14
[58] Field of Search ..................... 173/12; 91/59, 33

[56] References Cited
UNITED STATES PATENTS
3,491,837    1/1970    Seccombe et al..................... 173/12

*Primary Examiner*—Ernest R. Purser
*Attorney, Agent, or Firm*—M. E. Martin

[57] ABSTRACT

An automatic reversing control for fluid operated rotary tools which is responsive to a fluid pressure increase in a motor inlet passage to cause a reversal of the direction of motor rotation. A shiftable spool valve is biased to reverse the motor by pressure fluid acting on the valve spool. A spring biased check valve is operable to valve biasing fluid to actuate the spool valve in response to sensing a predetermined fluid pressure in the motor inlet passage. An operator actuated start valve is disposed between the reversing valve and the motor to initiate and control the operating cycle of the tool.

9 Claims, 3 Drawing Figures

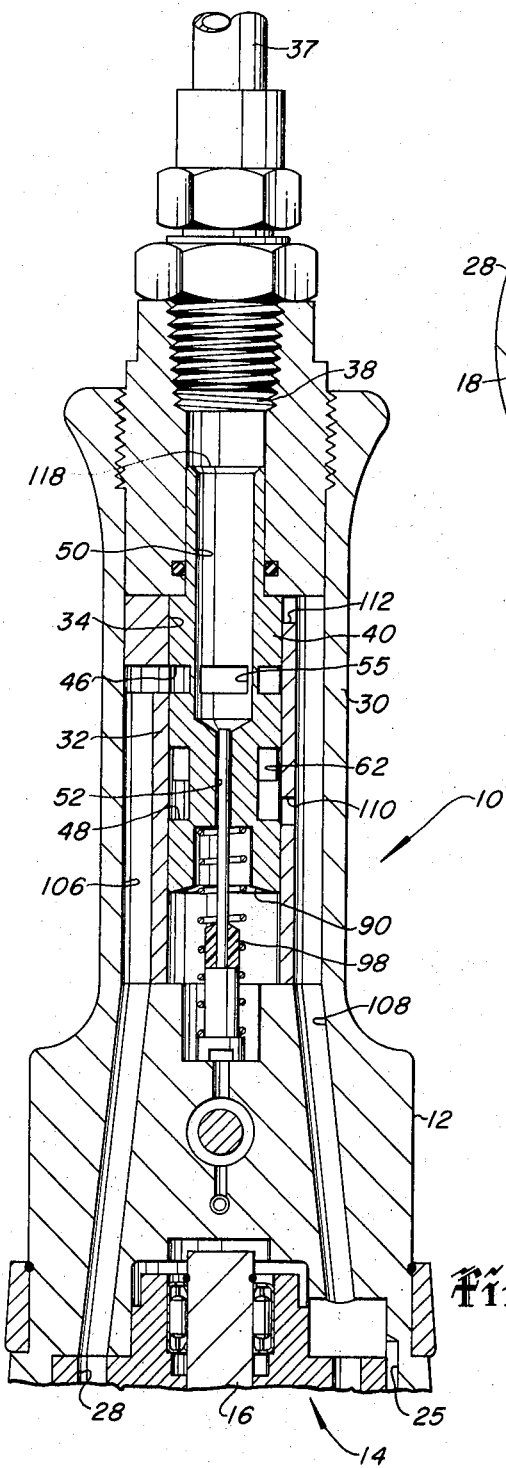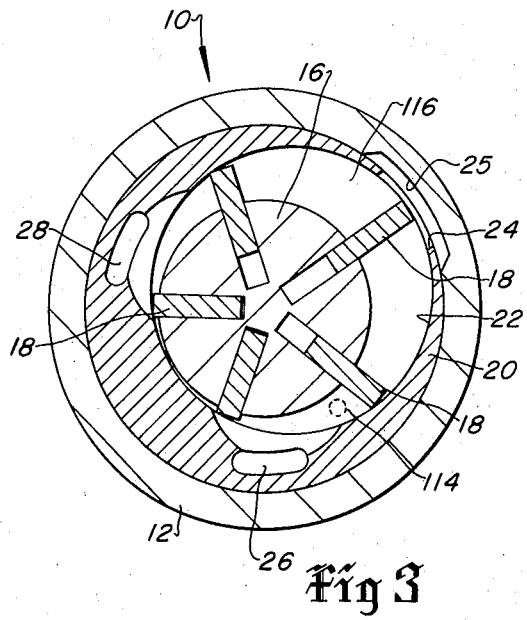

MOTOR REVERSING CONTROL FOR FLUID OPERATED TOOL

BACKGROUND OF THE INVENTION

Various types of fluid operated rotary tools require the operation of the tool motor in opposite directions of rotation in order to complete the operating cycle of the tool. Tools used for tapping threads in holes, tube rolling, stud driving, and certain types of specialized fastener driving require that the tool motor operate in one direction of rotation until a predetermined maximum torque is developed and then reverse the direction of rotation to complete the tool operation. It is known to provide motor reversing controls on fluid operated tools which require manual actuation of a control valve to reverse the motor. Examples of operator actuated reversing controls are disclosed in U.S. Pat. Nos. 3,093,360 to J.P. Krouse and 3,635,605 to R.J. Hall et al. It is also known to provide motor shutoff controls for fluid operated tools which are responsive to a fluid pressure condition in the tool to actuate a valve to shut off the motive fluid flow. An example of such a control is disclosed in my U.S. Pat. No. 3,493,056. In fluid operated tools it is advantageous and in some types of tools it is often necessary to sense the pressure condition of the tool working fluid to control motor direction of rotation. Automatic motor reversing controls responsive to a pressure condition of the tool working fluid can increase the speed of a tool operating cycle, and they are more reliable and economical than mechanical reversing devices.

SUMMARY OF THE INVENTION

The present invention provides for a motor reversing control for fluid operated tools which is operable to automatically reverse the motor direction of rotation. The present invention also provides an automatic motor reversing control for a fluid operated tool which is responsive to a predetermined working fluid pressure condition in the tool to cause the tool motor to be reversed. By sensing the working fluid pressure at or near the motor inlet the reversing control of the present invention may be used to reverse the motor upon the development of a predetermined motor output torque.

The present invention further provides a motor reversing control for a fluid operated tool which is adjustable to control the maximum torque developed by the motor prior to automatic reversal of motor rotation.

With the automatic motor reversing control of the present invention fluid powered tools requiring bidirectional operation of the tool motor may perform their operating cycles more accurately and rapidly than with heretofore known controls.

BRIEF DESCRIPTION OF THE DRAWINGS

FIG. 2 is a longitudinal section view of the tool of FIG. 1 taken to show passages leading to the tool motor from the motor reversing valve.

FIG. 3 is a transverse section taken along the line 3—3 of FIG. 1.

DESCRIPTION OF THE PREFERRED EMBODIMENT

Figure 1:
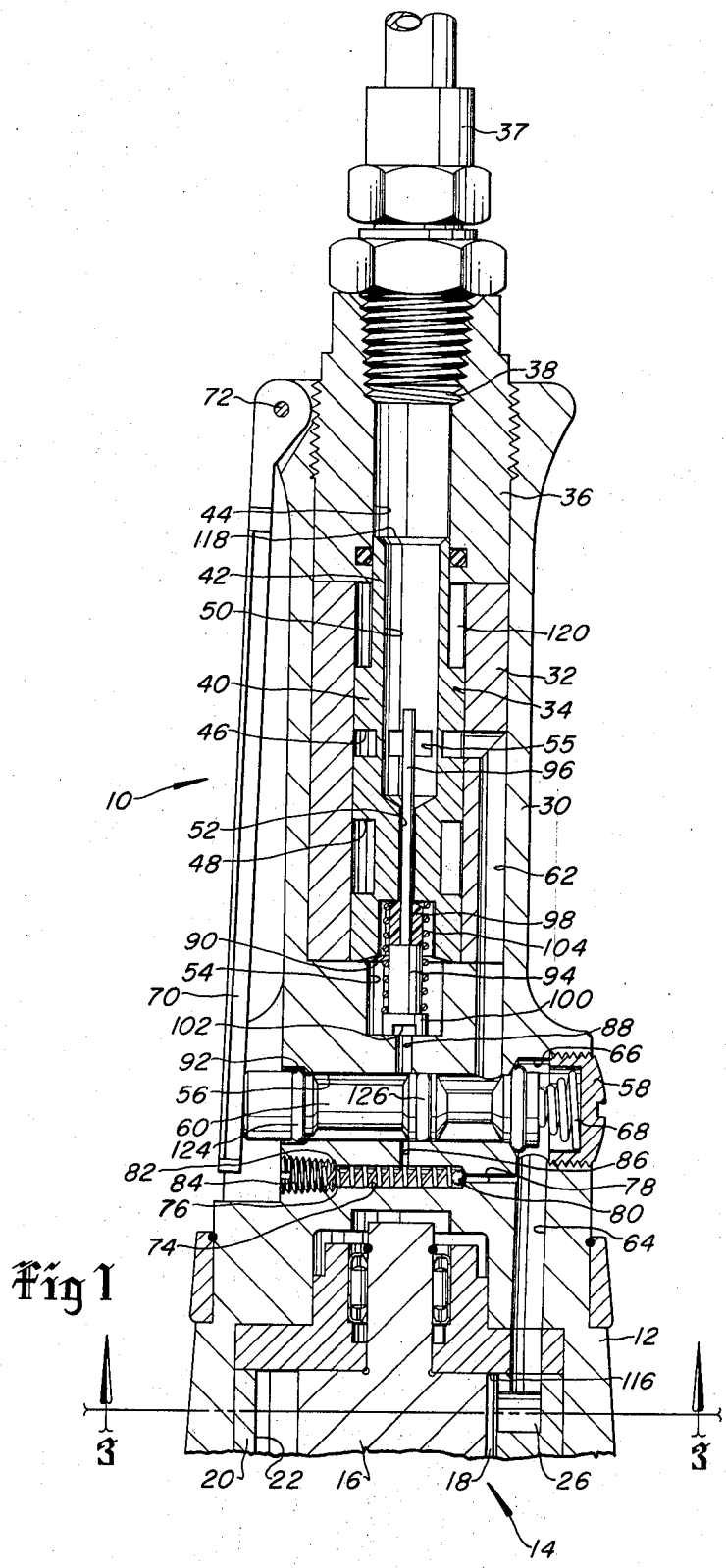
FIG. 1 is a longitudinal section view of a fluid operated tool including the automatic reversing control of the present invention.

Referring to the drawings and in particular to FIGS. 1 and 3 the present invention is embodied in a fluid operated tool generally designated by the numeral 10. The tool 10 includes a housing 12, only a portion of which is shown, and which may include, in a portion not shown, suitable driving mechanism for performing one or more of the various operations herein mentioned. Disposed in the housing 12 is a fluid operated motor 14 of the well known rotary vane type including a rotor member 16 and a plurality of radially movable vanes 18. The rotor 16 is disposed in a cylinder 20 having a bore 22 such that the rotor axis of rotation is spaced from but generally parallel to the central axis of the bore. The motor 14 includes an exhaust port 24 opening to an exhaust passage 25 in the housing 12, and inlet ports 26 and 28 which are separately operable to deliver pressure fluid to operate to rotate the rotor 16 in opposite directions. That is, viewing FIG. 3, when the port 28 is operable to conduct pressure fluid to the bore 22 the rotor is forced to turn clockwise and when the port 26 is conducting pressure fluid to the bore the rotor turns counterclockwise. With the arrangement of the motor 14 the inlet port 26 acts as an exhaust port when the rotor is rotating clockwise and the port 28 operates as an exhaust port when the rotor is rotating counterclockwise. Other reversible motors are known which can be readily adapted to be used in place of the motor 14.

The housing 12 includes a hollow handle portion 30 in which is disposed a sleeve member 32 having a longitudinal bore 34. A connecting part 36 is attached to the handle 30 and includes a fluid inlet passage 38. The part 36 is connected to a hose 37 which in turn is adapted to be connected to a source of pressure fluid such as compressed air.

The tool 10 includes motor reversing valve means comprising a spool type valve member 40 closely fitted and slidably disposed in the bore 34 and including a reduced diameter portion 42 disposed in a bore 44 in the part 36. The valve member 40 includes annular grooves 46 and 48 and an enlarged longitudinal passage 50 opening to the inlet passage 38. A reduced diameter passage 52 opens into the passage 50 and also to a chamber 54 in the housing 12. The passage 50 is in communication with groove 46 by way of openings 55.

The housing 12 also includes a transverse bore 56 which is closed at one end by a cap 58 and in which is slidably disposed a spool type start or throttle valve member 60. The housing 12 includes first passage means comprising a passage 62 opening into the bore 56 and to the bore 34 in the sleeve 32. The first passage means also includes a passage 64 which opens into an enlarged portion 66 of the bore 56 and is in communication with the motor inlet port 26. The start valve member 60 is biased by a spring 68 in the position shown in FIG. 1. The start valve member 60 is also engaged by a lever 70 pivotally attached to the handle 30 by a pin 72. The lever 70 is operable to be actuated by the tool operator to move the valve member 60 off of a valve seat formed at the intersection of the bore 56 with the portion 66 so that the passages 62 and 64 are placed in communication with each other.

Also formed in the housing 12 is a passage 74 having a partially threaded portion 76. A small passage 78 opens into the passage 74 from the passage 64. Pressure sensing means comprising a pressure responsive check valve 80 is shown seated over one end of the passage 78 and is engaged by a coil spring 82. An adjusting screw 84 disposed in the threaded portion 76 is engaged with the opposite end of the coil spring 82 for adjusting the biasing force of the spring on the check valve 80 and accordingly the fluid pressure in the passage 78 required to unseat the valve. When the fluid pressure in passage 64 is sufficient to unseat valve 80 passages 86 and 88 opening to the bore 56 conduct pressure fluid from the passage 64 and the passage 74 to valve operating means comprising the chamber 54 and an end face 90 on the valve member 40. When the start valve member 60 is in the released position shown in FIG. 1, however, the passages 86 and 88 are vented through orifice means comprising an annular groove 92 to the exterior of the tool.

The motor reversing control of the present invention further includes a member 94 disposed partly in the chamber 54 and having an elongated stem portion 96 extending through the passage 52. The stem portion 96 limits the effective fluid flow area of the passage 52 as well as serving as a guide for supporting the member 94 in the chamber. A resilient closure element 98 on the stem portion 96 blocks the end of the passage 52 from communication with the chamber 54 in a first position of the valve member 40 which is the position shown in FIG. 1. The member 94 includes a flanged end portion 100 having a passage 102 providing for communication of the passage 88 with the chamber 54. A coil spring 104 surrounds the member 94 and biases the member in the chamber 54 and away from the valve member 40. The element 98 comprises closure means for preventing the flow of pressure fluid into the chamber 54 in the position of the valve member 40 shown in FIG. 1 and the stem portion 96 comprises a flow restriction to limit the flow of pressure fluid from the passage 50 to the chamber 54 when the valve member 40 is in the position shown in FIG. 2.

Referring further to FIG. 2 second passage means comprising a passage 106 is formed in the housing 12 which is in communication with the inlet port 28 and the bore 34. As shown by the position of the valve member 40 in FIG. 2 the passage 106 is operable to receive pressure fluid through the passage 50 and the annular groove 46. The housing 12 also includes an exhaust passage 108 which opens into the main motor exhaust passage 25 and is in communication with the bore 34 by way of openings 110 and 112 in the sleeve member 32. In the position of the valve member 40 shown in FIG. 2 the passage 62 is in communication with the exhaust passage 108 by way of the annular groove 48 in the valve member. Accordingly, the motor 14 is also operable to be driven clockwise, viewing FIG. 3, with the port 26 operating as an exhaust port when the valve member 40 is in a second position as shown in FIG. 2 and when the start valve member 60 is in the actuated position to connect passages 62 and 64 by way of bore 60.

The motor reversing control of the present invention is operable to provide for reversible operation of the motor 14 in response to a change in a pressure condition of the working fluid. In the operation of most fluid operated rotary motors including vane type motors an increase in the torque load on the motor will usually cause a decrease in motor speed and an increase in the pressure of the working fluid in the supply passage at or near the motor inlet port. A pressure change is also usually observed in the motor chambers which are formed in the cylinder bore 22 between pairs of adjacent vanes. It is also known that a decrease in motor exhaust pressure occurs with decreasing motor speed and increasing torque and may be used alone or in connection with increasing motor inlet pressure to signal the increase in motor torque. Accordingly, the present invention contemplates the use of a change in a pressure condition of the tool working fluid to actuate a motor reversing control and discloses in detail a control which senses the working fluid pressure in the motor inlet passage between the start or throttle valve 60 and the motor working chamber formed by the bore 22. Alternatively, referring to FIG. 3, an opening designated by numeral 114 may be placed in the end wall 116 of the motor 14 to sense the pressure of the fluid in the bore 22. The passage 78 could, of course, be suitably connected to the opening 114 instead of the passage 64.

Prior to the commencement of an operating cycle of the tool 10 and with pressure fluid supplied to the inlet passage 38 the start valve member 60 is biased in the released position shown in FIG. 1 by the spring 68. With the start valve member in the position of FIG. 1 the passage 74 and chamber 54 are vented to the exterior of the tool through the groove 92. Accordingly, a pressure force acting on a transverse end face 118 of the reversing valve member 40 which is opposed to the end face 90 is sufficient to bias that member in the FIG. 1 position whereby pressure fluid is conducted through passage 50 and annular groove 46 to passage 62. The space 120 formed between the bore 34 and the reduced diameter portion 42 is vented through opening 112 and exhaust passage 108. In the position of the reversing valve member 40 shown in FIG. 1 the passage 106 and the inlet port 28 are in communication with the exhaust passage 108 by way of the space 120, and the opening 112, shown in FIG. 2. When the lever 70 is depressed the start valve member 60 is moved to open to allow pressure fluid to flow to the passage 64 and the inlet port 26 to energize the motor in a counterclockwise direction of rotation, viewing FIG. 3. When the start valve member 60 is actuated the groove 92 is closed off from communication with passages 86 and 88 by a portion of the start valve member comprising the O-ring 124.

As the torque resisting rotation of the motor rotor 16 increases, the fluid pressure in passage 64 will change condition by also increasing. This change in pressure will be sensed by the check valve 80 and at a predetermined pressure force acting on the check valve sufficient to overcome the opposing force of spring 82 the check valve will open to provide for pressure fluid to flow into the passage 74 and through passages 86 and 88 and into chamber 54. Pressure fluid acting on the end face 90 will cause the valve member 40 to shift toward the position of FIG. 2. As the valve member 40 moves to the FIG. 2 position, the passage 52 is moved away from the element 98 to allow pressure fluid from passage 50 to flow into chamber 54 further urging and holding the reversing valve member in the FIG. 2 position. Pressure fluid at substantially the inlet pressure to the tool will flow through passages 88 and 86 into passage 74 urging the check valve 80 to close. As long as the lever 70 maintains the start valve member 60 in the position blocking the groove 92 from communicating with the bore 56 between the O-ring seals 124 and 126 pressure fluid in the chamber 54 will hold the valve member 40 in the position which will provide for flow of pressure fluid through passage 106 to inlet port 28. Accordingly, the motor direction of rotation will be automatically and rapidly reversed upon developing a predetermined pressure condition which is related to a predetermined torque output exerted by the motor rotor 16.

The areas of the opposed faces 90 and 118 are selected to provide for shifting of the valve member 40 with the pressure in the passage 64 which corresponds to the free speed of the motor. This is the minimum pressure condition which would exist in the motor inlet compared to the pressure in the inlet passage 38. The motor inlet pressure and torque condition at which the reversing valve is actuated to move to the FIG. 2 position may be increased from the free speed condition over a substantial range by adjusting the screw 84 to increase the biasing force of the spring 82. When the motor 14 has run in the reverse direction sufficiently to complete the intended operation to be performed by the tool the operating lever 70 is released to permit the start valve member 60 to return to the position of FIG. 1 under the urging of the spring 68. Upon returning to the FIG. 1 position the start valve member 60 will provide for venting of pressure fluid from chamber 54 through passage 88 and groove 92. The pressure in chamber 54 will decrease because the flow area of passage 88 and groove 92 is greater than the effective flow area of passage 52 due to the presence of the stem portion 96. Accordingly, an unbalanced pressure force acting on the end face 118 will cause the reversing valve member 40 to return to the first position shown in FIG. 1 in readiness for another operating cycle. Moreover, at any time during the operation of the tool the flow of fluid through either passage 62 or 106 may be stopped by releasing the lever 70 to allow the start valve 60 to close blocking the flow of fluid through passage 62 and venting chamber 54 to cause the valve member 40 to return to the position of FIG. 1.

What is claimed is:

1. A fluid actuated tool including:
   a housing containing a reversible fluid motor, a fluid inlet passage, first passage means for conducting pressure fluid to operate said motor in one direction, and second passage means for conducting pressure fluid to operate said motor in the opposite direction;
   a fluid actuated reversing valve including valve operating means and a reversing valve member movable between a first position in which said inlet passage is connected to said first passage means and a second position in which said inlet passage is connected to said second passage means;
   pressure sensing valve means operable to move from a closed to an open condition in response to a predetermined fluid pressure in said tool for conducting pressure fluid to said valve operating means to move said reversing valve member to said second position; and,
   means for biasing said valve means in said closed condition and for adjusting the predetermined pressure at which said valve means moves to said open condition.

2. The invention set forth in claim 1 wherein:
said valve means comprises a check valve interposed in a passage interconnecting said first passage means and said valve operating means, and said means for biasing said valve means in a closed condition comprises a spring including means for adjusting the biasing force of said spring to be yieldable to provide for said check valve to open in response to a predetermined pressure in said first passage means for conducting pressure fluid from said first passage means to said valve operating means.

3. The invention set forth in claim 1 wherein:
said housing includes an exhaust passage in communication with said reversing valve for conducting motor exhaust fluid from said second passage means when said reversing valve is in said first position and for conducting motor exhaust fluid from said first passage means when said reversing valve is in said second position.

4. The invention set forth in claim 1 wherein:
said reversing valve includes means for biasing said reversing valve member in said first position, and said valve operating means comprises a pressure surface on said reversing valve member and a chamber formed in said housing, said pressure surface being responsive to the admission of pressure fluid to said chamber from said pressure sensing valve means to move said reversing valve member toward said second position.

5. The invention set forth in claim 4 wherein:
said reversing valve includes a passage opening from said inlet passage to said chamber, and closure means disposed to close said passage when said reversing valve member is in said first position and to open said passage to provide for the admission of pressure fluid from said inlet passage to said chamber in response to the movement of said reversing valve member toward said second position.

6. The invention set forth in claim 5 together with:
a start valve movable between actuated and released positions and disposed to block the flow of pressure fluid through said first passage means in said released position and to provide for flow of pressure fluid through said first passage means in said actuated position, said start valve including means for venting said chamber in said released position.

7. The invention set forth in claim 6 wherein:
said start valve includes a portion disposed in a passage between said pressure sensing valve means and said chamber for connecting said passage to orifice means in said tool to vent pressure fluid from said chamber at a rate greater than can be supplied to said chamber from said inlet passage when said start valve is in said released position.

8. The invention set forth in claim 5 wherein:
said reversing valve member comprises a valve spool disposed in a bore in said housing for reciprocable movement between said first and second positions, said pressure surface comprises a transverse end face on said spool and said means for biasing said reversing valve member in said first position comprises an opposed transverse end face on said spool facing said inlet passage.

9. The invention set forth in claim 8 wherein:
said passage opening from said inlet passage to said chamber comprises a longitudinal passage disposed in said valve spool, and said closure means comprises a closure element disposed in said chamber and engageable with one end of said longitudinal passage to close said longitudinal passage when said valve spool is in said first position.

* * * * *